Patented Nov. 4, 1952

2,616,875

UNITED STATES PATENT OFFICE 2,616,875

SHORTSTOPPING OF BUTADIENE-1,3 EMULSION POLYMERIZATION

James W. Adams, Oxford, and James A. Reynolds, Naugatuck, Conn., assignors to United States Rubber Company, New York, N. Y., a corporation of New Jersey No Drawing. Application September 6, 1951, Serial No. 245,421

18 Claims. (Cl. 260—84.3)

1

This invention relates to the use of new shortstopping agents in the preparation of synthetic rubber latices.

It is known to produce synthetic rubber latices by the emulsion polymerization of butadiene-1,3 hydrocarbons and the emulsion copolymerization of butadiene-1,3 hydrocarbons with copolymerizable material, such as styrene and acrylonitrile, in the presence of a catalyst and, if desired, a so-called polymerization regulator or modifier, such as an alkyl mercaptan having 6 to 18 carbon atoms or an aromatic mercaptan. In practice, the emulsion polymerization is not allowed to go to completion because of the excessive time necessary for conversion and because of the undesirable properties that may be imparted to the synthetic rubber where the polymerization has been permitted to go to complete conversion. Polymerization is generally permitted to go to around 45 to 90% of completion as determined by consumption of original monomers. In some cases, as where it may be desired to obtain a very soft rubber at low conversion for mixing with a higher viscosity rubber obtained at higher conversion, or the latices thereof, the polymerization may be stopped at lower conversions, e. g. as low as 20% conversion. The unreacted polymerizable monomeric materials are removed from the latex as by venting off monomers which are gaseous at atmospheric pressure, and steam or vacuum distilling residual higher boiling point or liquid monomers, and the thus recovered polymerizable monomers are utilized in subsequent emulsion polymerization. Before removing the unreacted monomers from the synthetic rubber latex, particularly any liquid monomers, there is added to the latex a so-called shortstopping agent which prevents further polymerization of the monomers during the removal operation. The polymerization of residual monomers during the monomer removing or so-called stripping operation imparts undesirable physical properties to the synthetic rubber. The substance used for stopping such a reaction must, therefore, be one which will arrest polymerization at the reaction temperature and also protect the polymer from undesired changes during the removal of reacted monomers. The efficiency of a stopping agent in both these respects may be conveniently tested by adding the agent to a partially polymerized emulsion system, and aging the emulsion in the presence of the residual unreacted monomers. The aging may be done at the temperature of reaction, or at a higher temperature if a more rigorous test is desired. At the end of the aging period the conversion of monomers to polymer is determined, and if it has not increased the stopping agent is considered satisfactory in this respect. The monomers are then removed and the polymer is isolated from the latex by well-known methods of coagulation. Its viscosity is then compared with a standard, i. e. with that of a sample to which a known stopping agent has been added. In this manner a measure of the stopping agent's efficiency in both the above cited respects may be determined.

We have discovered that the reaction products of alkylene polyamines with sulfur are excellent shortstopping agents for synthetic rubber emulsion polymerizations.

Sulfur reacts with alkylene polyamines to form water-soluble or water-miscible reaction products. The sulfur may be in amount from 15 to 100 parts per 100 parts of the alkylene polyamine. Various alkylene polyamines, such as ethylene diamine, 1,2-propylene diamine, 1,2-butylene diamine, 1,3-butylene diamine, 1,4-butylene diamine, diethylene triamine, triethylene tetramine, tetraethylene pentamine, and higher ethylene polyamines may be used. The reaction of the sulfur with the alkylene polyamine is exothermic to give a reaction product which, if not soluble in water immediately, may be readily solubilized by heating for a short period at elevated temperature, e. g. 80° C. to 100° C., or allowing the reaction product to age for several hours at room temperature. That sulfur is soluble in alkylene polyamines is shown in the article "New aliphatic amines," by A. L. Wilson, Ind. Eng. Chem. 27, 867–871 (1935). Little is known concerning the composition of the products formed in this reaction. However, it is probable that sulfides, disulfides, polysulfides and/or mixtures of these and other compounds are present in the reaction product. Reactions of sulfur with diethylene triamine and higher polyethylene polyamines are homogeneous reaction mixtures. With reaction products of sulfur and ethylene diamine, water-soluble crystals precipitate on standing at room temperature for 24 to 48 hours, The crystals may be readily separated from the mother liquor, as by vacuum filtration. Such crystals, or the mother liquor, or the whole reaction mixture, may be used as shortstopping agents in synthetic rubber polymerizations. In the tests shown in the tables below, the entire reaction mixture of the alkylene polyamine was used unless otherwise indicated. The amount of alkylene polyamine-sulfur reaction product to stop the polymerization reaction should be in the range of 0.5 to 1 part by weight per 100 parts of polymerizable material originally present in the emulsion. The reaction product may be added as such, or mixed with any desired amount of water, to the aqueous emulsion polymerizate after conversion of 20 to 90%, and generally 45 to 90%, of polymerizable monomers originally present to synthetic rubber depending on the particular monomers and the physical properties desired in the final product. The reaction product may be added to the synthetic rubber latex to stop further polymerization before removal of any unreacted monomers. If the synthetic rubber latex is prepared from mixtures of low boiling monomers, such as butadiene, and high boiling monomers, such as styrene or acrylonitrile, the butadiene may be vented from the reactor by reducing the pressure to atmospheric pressure before addition of the alkylene polyamine-sulfur reaction product, after which addition the higher boiling monomers, such as styrene or acrylonitrile, may be recovered by conventional steam or vacuum distillation. In any case, the reaction product should be added to the latex after the desired polymerization of 45 to 90% conversion and while the latex still contains unreacted monomeric material.

The polymerizable material for the preparation of the synthetic rubber may be one or a mixture of butadiene-1,3 hydrocarbons, for example, butadiene-1,3, 2-methylbutadiene-1,3 (isoprene), piperylene, 2,3-dimethylbutadiene-1,3. The polymerizable material as is known may be a mixture of one or more of such butadiene-1,3 hydrocarbons with one or more other polymerizable compounds which are capable of forming rubbery copolymers with butadiene-1,3 hydrocarbons, for example, up to 70% of such mixture of one or more compounds which contain a single $CH_2=C<$ group where at least one of the disconnected valences is attached to an electro-negative group, that is, a group which substantially increases the electrical dissymmetry or polar character of the molecule. Examples of compounds which contain a $CH_2=C<$ group and are copolymerizable with butadienes-1,3 are aryl olefins, such as styrene, and vinyl naphthalene; the alpha methylene carboxylic acids, and their esters, nitriles and amides, such as acrylic acid, methyl acrylate, methyl methacrylate, acrylonitrile, methacrylamide; methyl vinyl ether; methyl vinyl ketone; vinylidene chloride.

The catalysts used in the preparation of such synthetic rubber latices are the conventional peroxygen or azo catalysts. Examples of peroxygen catalysts are hydrogen peroxide, per-salts, e. g. alkali persulfates, alkali perborates and alkali percarbonates, and organic peroxides, e. g. diacetyl peroxide, dibenzoyl peroxide, acetyl benzoyl peroxide, tertiary butyl hydroperoxide, cumene hydroperoxide. Examples of azo catalysts are alpha, alpha'-azobis-isobutyronitrile, and p-methoxy benzene diazo thio 2-naphthyl ether.

The following examples are illustrative of the invention, all parts and percentages referred to being by weight:

*Example I*

The following reduction-activated organic peroxide-catalyzed (redox) monomer emulsion recipe was polymerized at 5° C. in an internally agitated autoclave:

| | Parts by weight |
|---|---|
| Butadiene-1,3 | 71 |
| Styrene | 29 |
| Water | 200 |
| Cumene hydroperoxide | 0.12 |
| Mixed tertiary $C_{12}$-, $C_{14}$- and $C_{16}$-mercaptans | 0.21 |
| Potassium salt of disproportionated rosin acids | 4. |
| Potassium pyrophosphate | 0.17 |
| Ferrous sulfate | 0.2 |
| Potassium bisulphite | 0.08 |
| Potassium hydroxide | 0.05 |
| Trisodium phosphate | 0.3 |
| Sodium salt of naphthalene sulfonic acid condensed with formaldehyde | 0.1 |

After partial polymerization, portions of the latex were withdrawn directly into crown capped bottles, and aqueous solutions of various shortstopping agents of the present invention were added. At the same time, one portion of the latex was similarly treated with 2,4-dinitrochlorobenzene, and another portion was treated with sodium dimethyl dithiocarbamate, both known stopping agents for use as standards of comparison. No shortstopper was added to a control portion. The bottles were then placed in a constant temperature bath at 50° C. and rotated end over end for 19 hours. Excess butadiene was then allowed to evaporate and the conversion of monomers to polymer was determined in each case by evaporation of a weighed sample of the latex portion. The bulk of the latices were then steam distilled to remove excess styrene, and coagulated. The polymers were dried. The plasticities of the products were measured on the Mooney Shearing Disc Plastometer (as described by Mooney in "Industrial and Engineering Chemistry" (analytical edition) 6, 147 (1934)). The results are given as Mooney viscosities on an arbitrary scale, the higher the value the more difficult to break down mechanically, and the greater the cross-linking. Obtaining approximately the same Mooney viscosities from latices to which have been added an unknown material to be tested as a shortstopping agent and a known shortstopping agent or standard and then aged in the presence of the unreacted monomers, or obtaining a lower Mooney viscosity for the material to be tested, shows the effectiveness of the unknown material as a shortstopper.

The conversions with the various shortstoppers of the present invention, with the standard 2,4-dinitrochlorobenezene, and with the standard sodium dimethyl dithiocarbamate, the conversion of the control, the Mooney viscosities of the polymers from the latices shortstopped with the shortstoppers of the present invention, with the standard 2,4-dinitrochlorobenzene and with sodium dimethyl dithiocarbamate, and the Mooney viscosity of the control, are shown in the following table. The "amount" in the second column of the table means the parts of added shortstopping agent based on 100 parts of polymerizable material originally in the emulsion to be polymerized.

| Shortstopping Agent | Amount | Percent Conversion | Mooney Viscosity |
|---|---|---|---|
| Reaction product of 70 parts of ethylene diamine and 30 parts of sulfur | 0.05 | 60.4 | 51.5 |
|  | .1 | 58.5 | 46 |
|  | .2 | 59.1 | 37.5 |
|  | .4 | 58.5 | 39 |
| Reaction product of 70 parts of diethylene triamine and 30 parts of sulfur | .05 | 62.4 | 51 |
|  | .1 | 59.1 | 41.5 |
|  | .2 | 59.1 | 44 |
|  | .4 | 59.5 | 39 |
| Reaction product of 70 parts of triethylene tetramine and 30 parts of sulfur | .05 | 62.0 | 51 |
|  | .1 | 59.8 | 39 |
|  | .2 | 59.8 | 37 |
|  | .4 | 60.1 | 39 |
| Reaction product of 70 parts of tetraethylene pentamine and 30 parts of sulfur | .05 | 64.0 | 49.5 |
|  | .1 | 63.4 | 47 |
|  | .2 | 64.3 | 44 |
|  | .4 | 62.0 | 40 |
| 2,4-Dinitrochlorobenzene (standard) | .2 | 63.7 | 40 |
| Sodium dimethyl dithiocarbamate (standard) | .2 | 62.4 | 44 |
| None (control) |  | 84.2 | 109 |

The conversions and plasticity of the polymers prepared with the shortstopping agents of the present invention are comparable to those prepared with known effective shortstopping agents.

*Example II*

The reaction product of 70 parts of diethylene triamine with 30 parts of sulfur was compared as a shortstopping agent with 2,4-dinitrochlorobenzene as a standard and with sodium thiosulfate and sodium sulfide in the latex of Example I. After addition to the partially polymerized latex of the ethylene diamine-sulfur reaction product, the 2,4-dinitrochlorobenzene, and the sodium thiosulfate and the sodium sulfide, the latex portions, together with a control portion to which no shortstopping agent had been added, were aged at 45° for 21.3 hours. Results are shown in the following table:

| Shortstopping Agent | Amount | Percent Conversion | Mooney Viscosity |
|---|---|---|---|
| Reaction product of 70 parts of diethylene triamine and 30 parts of sulfur | 0.05 | 52.8 | 44 |
|  | .1 | 52.3 | 42 |
|  | .2 | 52.3 | 41 |
|  | .4 | 51.3 | 38 |
| 2,4-Dinitrochlorobenzene (standard) | .2 | 52.2 | 37 |
| None (control) |  | 77.9 | 110 |
| Sodium thiosulfate | .1 | 69.3 | 105 |
|  | .2 | 75.8 | 105 |
|  | .4 | 75.8 | 110 |
| Sodium sulfide | .1 | 78.6 | 115 |
|  | .2 | 77.5 | 110 |
|  | .4 | 72.7 | 115 |

The data in the above table demonstrates that sodium thiosulfate and sodium sulfide, if present in the reaction mixture, were not the active principals of the shortstopping agents of the present invention.

*Example III*

Seventy parts of ethylene diamine were reacted with thirty parts of sulfur. The reaction was rapid, giving a clear, fluid solution. On standing overnight, water-soluble crystals formed in the reaction mixture. The crystals were filtered and washed with isopropanol. The crystals thus separated, and the filtrate or mother liquor, and also the whole reaction mixture (crystals and mother liquor) were tested as shortstopping agents. Similarly, the whole reaction mixture of eighty-five parts of ethylene diamine and fifteen parts of sulfur was also tested as a shortstopping agent. 2,4-Dinitrochlorobenzene was used as a standard, and a control with no added shortstopping agent was also run. The latex was that of Example I, and the latex was aged at 50° C. for 16.8 hours after addition of the shortstopping agents.

The results are shown in the following table:

| Shortstopping Agent | Amount | Percent Conversion | Mooney Viscosity |
|---|---|---|---|
| Reaction product of 70 parts of ethylene diamine and 30 parts of sulfur-crystals only | 0.1 | 53.8 | 53 |
|  | .15 | 52.0 | 42 |
|  | .2 | 52.8 | 45 |

| Shortstopping Agent | Amount | Percent Conversion | Mooney Viscosity |
|---|---|---|---|
| Reaction product of 70 parts of ethylene diamine and 30 parts of sulfur-filtrate | 0.1 | 53.8 | 46 |
|  | .15 | 53.8 | 50 |
|  | .2 | 52.0 | 43 |
| Reaction product of 70 parts of ethylene diamine and 30 parts of sulfur-whole reaction mixture | .1 | 50.1 | 39 |
|  | .15 | 53.1 | 47 |
|  | .2 | 57.2 | 63 |
| 2,4-Dinitrochlorobenzene (standard) | .2 | 54.9 | 48 |
| None (control) |  | 88 | 133 |

*Example IV*

The following persulfate catalyzed emulsion recipe was polymerized at 50° C in an internally agitated autoclave:

| | Parts by weight |
|---|---|
| Butadiene-1,3 | 71 |
| Styrene | 29 |
| Water | 180 |
| Sodium fatty acid soap | 5 |
| Potassium persulfate | 0.3 |
| Dodecyl mercaptan | 0.4 |

After partial polymerization, portions of the latex were withdrawn directly into crown capped bottles, and to the latex portions were added various amounts of the reaction product of 70 parts of ethylene diamine and 30 parts of sulfur. A standard using hydroquinone as the known shortstopping agent, and a control with no addition of shortstopping agent were also run. The latices were aged after the shortstopper addition for 24 hours at 50° C.

The results are shown in the following table:

| Shortstopping Agent | Amount | Percent Conversion | Mooney Viscosity |
|---|---|---|---|
| Reaction product of 70 parts of ethylene diamine and 30 parts of sulfur | 0.2 | 79.7 | 73 |
|  | .5 | 76.5 | 66 |
|  | 1.0 | 78.3 | 70 |
| Hydroquinone (standard) | .1 | 78.3 | 70 |
| None (control) |  | 100 | 110 |

*Example V*

The following polyalkylene polyamine-activated organic hydroperoxide-catalyzed emulsion recipe was polymerized at 5° C. in an internally agitated autoclave:

| | Parts by weight |
|---|---|
| Butadiene-1,3 | 71 |
| Styrene | 29 |
| Water | 200 |
| Potassium fatty acid soap | 4.7 |
| Potassium chloride | 0.4 |
| Tertiary dodecyl mercaptan | 0.16 |
| Cumene hydroperoxide | 0.15 |
| Diethylene triamine | 0.125 |
| Sodium salt of naphthalene sulfonic acid condensed with formaldehyde | 0.05 |

After partial polymerization, portions of the latex were withdrawn directly into crown capped bottles, and to the latex portions were added various amounts of the reaction product of 70 parts of ethylene diamine and 30 parts of sulfur. A standard using sodium dimethyl dithiocarbamate as the known shortstopping agent was also run. The latices were aged after the shortstopper additions for 22.5 hours at 50° C.

The results are shown in the following table:

| Shortstopping Agent | Amount | Percent Conversion | Mooney Viscosity |
|---|---|---|---|
| Reaction product of 70 parts of ethylene diamine and 30 parts of sulfur | 0.1 | 65.6 | 80 |
| | .3 | 65.5 | 80 |
| | .5 | 65.5 | 89 |
| | 1 | 63.7 | 82 |
| Sodium dimethyl dithiocarbamate | .2 | 67.6 | 94 |

The above examples clearly show that the reaction products of alkylene polyamines with sulfur are effective shortstopping agents for the various known types of synthetic rubber emulsion polymerizations In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. In the preparation of a synthetic rubber latex by the polymerization of an aqueous emulsion of polymerizable material selected from the group consisting of butadiene-1,3 hydrocarbons and mixtures of butadiene-1,3 hydrocarbons with compounds which contain a $CH_2=C<$ group and are copolymerizable with butadiene-1,3 hydrocarbons, the step which comprises adding to the emulsion 0.05 to 1 part of an alkylene polyamine-sulfur reaction product per 100 parts of polymerizable material initially present before complete conversion of the polymerizable material originally present in the emulsion to synthetic rubber and while the latex contains unreacted polymerizable monomeric material.

2. In the preparation of a synthetic rubber latex by the polymerization of an aqueous emulsion of a mixture of butadiene-1,3 hydrocarbon with a compound which contains a $CH_2=C<$ group and is copolymerizable with butadiene-1,3, the step which comprises adding to the emulsion 0.05 to 1 part of the reaction product of 100 parts of an ethylene polyamine with sulfur per 100 parts of polymerizable material initially present, after conversion of 45 to 90% of the polymerizable material originally present in the emulsion to synthetic rubber and while the latex contains unreacted polymerizable monomeric material.

3. In the preparation of a synthetic rubber latex by the polymerization of an aqueous emulsion of a mixture of butadiene-1,3 and styrene, the step which comprises adding to the emulsion 0.05 to 1 part of the reaction product of an alkylene polyamine with sulfur per 100 parts of polymerizable material initially present before complete conversion of the polymerizable material originally present in the emulsion to synthetic rubber and while the latex contains unreacted styrene.

4. In the preparation of a synthetic rubber latex by the polymerization of an aqueous emulsion of a mixture of butadiene-1,3 and styrene, the step which comprises adding to the emulsion 0.05 to 1 part of the reaction product of an ethylene polyamine with sulfur per 100 parts of polymerizable material initially present, after conversion of 45 to 90% of the polymerizable material originally present in the emulsion to synthetic rubber and while the latex contains unreacted styrene.

5. In the preparation of a synthetic rubber latex by the polymerization of an aqueous emulsion of polymerizable material selected from the group consisting of butadiene-1,3 hydrocarbons and mixtures of butadiene-1,3 hydrocarbons with compounds which contain a $CH_2=C<$ group and are copolymerizable with butadiene-1,3 hydrocarbons, the step which comprises adding to the emulsion 0.05 to 1 part of the reaction product of 100 parts of ethylene diamine with 15 to 100 parts of sulfur per 100 parts of polymerizable material initially present, after conversion of 45 to 90% of the polymerizable material originally present in the emulsion to synthetic rubber and while the latex contains unreacted polymerizable monomeric material.

6. In the preparation of a synthetic rubber latex by the polymerization of an aqueous emulsion of a mixture of butadiene-1,3 and styrene, the step which comprises adding to the emulsion 0.05 to 1 part by weight of the reaction product of 100 parts of ethylene diamine with 15 to 100 parts of sulfur per 100 parts by weight of polymerizable material initially present, after conversion of 45 to 90% of the polymerizable material originally present in the emulsion to synthetic rubber and while the latex contains unreacted styrene.

7. In the preparation of a synthetic rubber latex by the polymerization of an aqueous emulsion of a mixture of butadiene-1,3 hydrocarbon with a compound which contains a $CH_2=C<$ group and is copolymerizable with butadiene-1,3 the step which comprises adding to the emulsion 0.05 to 1 part by weight of the reaction product of 100 parts of diethylene triamine with 15 to 100 parts of sulfur per 100 parts by weight of polymerizable material initially present, after conversion of 45 to 90% of the polymerizable material originally present in the emulsion to synthetic rubber and while the latex contains unreacted polymerizable monomeric material.

8. In the preparation of a synthetic rubber latex by the polymerization of an aqueous emulsion of a mixture of butadiene-1,3 and styrene, the step which comprises adding to the emulsion 0.05 to 1 part by weight of the reaction product of 100 parts of diethylene triamine with 15 to 100 parts of sulfur per 100 parts by weight of polymerizable material initially present, after conversion of 45 to 90% of the polymerizable material originally present in the emulsion to synthetic rubber and while the latex contains unreacted styrene.

9. In the preparation of a synthetic rubber latex by the polymerization of an aqueous emulsion of polymerizable material selected from the group consisting of butadiene-1,3 hydrocarbons and mixtures of butadiene-1,3 hydrocarbons with compounds which contain a $CH_2=C<$ group and are copolymerizable with butadiene-1,3 hydrocarbons, the step which comprises adding to the emulsion 0.05 to 1 part of the reaction product of 100 parts of triethylene tetramine with 15 to 100 parts of sulfur per 100 parts of polymerizable material initially present, after conversion of 45 to 90% of the polymerizable material originally present in the emulsion to synthetic rubber and while the latex contains unreacted polymerizable monomeric material.

10. In the preparation of a synthetic rubber latex by the polymerization of an aqueous emulsion of a mixture of butadiene-1,3 and styrene, the step which comprises adding to the emulsion 0.05 to 1 part of the reaction product of 100 parts of triethylene tetramine with 15 to 100 parts of sulfur per 100 parts of polymerizable material initially present, after conversion of 45 to 90% of the polymerizable material originally present in the emulsion to synthetic rubber and while the latex contains unreacted styrene.

11. In the preparation of a synthetic rubber latex by the polymerization of an aqueous emulsion of a mixture of butadiene-1,3 hydrocarbon with a compound which contains a $CH_2=C<$ group and is copolymerizable with butadiene-1,3 the step which comprises adding to the emulsion 0.05 to 1 part of the reaction product of 100 parts of tetraethylene pentamine with 15 to 100 parts of sulfur per 100 parts of polymerizable material initially present, after conversion of 45 to 90% of the polymerizable material originally present in the emulsion to synthetic rubber and while the latex contains unreacted polymerizable monomeric material.

12. In the preparation of a synthetic rubber latex by the polymerization of an aqueous emulsion of a mixture of butadiene-1,3 and styrene, the step which comprises adding to the emulsion 0.05 to 1 part of the reaction product of 100 parts of tetraethylene pentamine with 15 to 100 parts of sulfur per 100 parts of polymerizable material initially present, after conversion of 45 to 90% of the polymerizable material originally present in the emulsion to synthetic rubber and while the latex contains unreacted styrene.

13. In the preparation of a synthetic rubber latex by the polymerization of an aqueous emulsion of polymerizable material selected from the group consisting of butadiene-1,3 hydrocarbons and mixtures of butadiene-1,3 hydrocarbons with compounds which contain a $CH_2=C<$ group and are copolymerizable with butadiene-1,3 hydrocarbons, the step which comprises adding the reaction product of 100 parts of an alkylene polyamine with 15 to 100 parts of sulfur to the emulsion after conversion of 45 to 90% of the polymerizable material originally present in the emulsion to synthetic rubber and while the latex contains unreacted polymerizable monomeric material, said reaction product being in amount to stop further polymerization.

14. In the preparation of a synthetic rubber latex by the polymerization of an aqueous emulsion of polymerizable material selected from the group consisting of butadiene-1,3 hydrocarbons and mixtures of butadiene-1,3 hydrocarbons with compounds which contain a $CH_2=C<$ group and are copolymerizable with butadiene-1,3 hydrocarbons, the step which comprises adding the reaction product of 100 parts of an ethylene polyamine with 15 to 100 parts of sulfur to the emulsion after conversion of 45 to 90% of the polymerizable material originally present in the emulsion to synthetic rubber and while the latex contains unreacted polymerizable monomeric material, said reaction product being in amount to stop further polymerization.

15. In the preparation of a synthetic rubber latex by the polymerization of an aqueous emulsion of polymerizable material selected from the group consisting of butadiene-1,3 hydrocarbons and mixtures of butadiene-1,3 hydrocarbons with compounds which contain a $CH_2=C<$ group and are copolymerizable with butadiene-1,3 hydrocarbons, the step which comprises adding the reaction product of 100 parts of ethylene diamine with 15 to 100 parts of sulfur to the emulsion after conversion of 45 to 90% of the polymerizable material originally present in the emulsion to synthetic rubber and while the latex contains unreacted polymerizable monomeric material, said reaction product being in amount to stop further polymerization.

16. In the preparation of a synthetic rubber latex by the polymerization of an aqueous emulsion of polymerizable material selected from the group consisting of butadiene-1,3 hydrocarbons and mixtures of butadiene-1,3 hydrocarbons with compounds which contain a $CH_2=C<$ group and are copolymerizable with butadiene-1,3 hydrocarbons, the step which comprises adding the reaction product of 100 parts of diethylene triamine with 15 to 100 parts of sulfur to the emulsion after conversion of 45 to 90% of the polymerizable material originally present in the emulsion to synthetic rubber and while the latex contains unreacted polymerizable monomeric material, said reaction product being in amount to stop further polymerization.

17. In the preparation of a synthetic rubber latex by the polymerization of an aqueous emulsion of polymerizable material selected from the group consisting of butadiene-1,3 hydrocarbons and mixtures of butadiene-1,3 hydrocarbons with compounds which contain a $CH_2=C<$ group and are copolymerizable with butadiene-1,3 hydrocarbons, the step which comprises adding the reaction product of 100 parts of triethylene tetramine with 15 to 100 parts of sulfur to the emulsion after conversion of 45 to 90% of the polymerizable material originally present in the emulsion to synthetic rubber and while the latex contains unreacted polymerizable monomeric material, said reaction product being in amount to stop further polymerization.

18. In the preparation of a synthetic rubber latex by the polymerization of an aqueous emulsion of polymerizable material selected from the group consisting of butadiene-1,3 hydrocarbons and mixtures of butadiene-1,3 hydrocarbons with compounds which contain a $CH_2=C<$ group and are copolymerizable with butadiene-1,3 hydrocarbons, the step which comprises adding the reaction product of 100 parts of tetraethylene pentamine with 15 to 100 parts of sulfur to the emulsion after conversion of 45 to 90% of the polymerizable material originally present in the emulsion to synthetic rubber and while the latex contains unreacted polymerizable monomeric material, said reaction product being in amount to stop further polymerization.

JAMES W. ADAMS.
JAMES A. REYNOLDS.

No references cited.